US012755062B2

(12) United States Patent
Mekuria et al.

(10) Patent No.: US 12,755,062 B2
(45) Date of Patent: Oct. 6, 2026

(54) PROTECTION AGAINST USB HID AUTOMATION ATTACKS

(71) Applicant: Dell Products L.P., Round Rock, TX (US)

(72) Inventors: Nathnael Mekuria, Pflugerville, TX (US); Adolfo S. Montero, Pflugerville, TX (US); Jonathan Samuel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/753,668

(22) Filed: Jun. 25, 2024

(65) Prior Publication Data

US 2025/0390614 A1 Dec. 25, 2025

(51) Int. Cl.
*G06F 21/83* (2013.01)

(52) U.S. Cl.
CPC ...... *G06F 21/83* (2013.01); *G06F 2221/2133* (2013.01)

(58) Field of Classification Search
CPC ... G06F 21/83; G06F 21/85; G06F 2221/2133
See application file for complete search history.

(56) References Cited

U.S. PATENT DOCUMENTS 10,097,583 B1 * 10/2018 Demirjian ............... H04L 63/20
2010/0156793 A1 * 6/2010 Ozias .................. G06F 3/04886 345/173
2011/0145451 A1 * 6/2011 Soffer ..................... G06F 3/023 710/64
2014/0337558 A1 11/2014 Powers
2015/0363590 A1 * 12/2015 Patel ..................... H04L 63/102 726/17
2016/0042175 A1 * 2/2016 Boodaei .................. G06F 21/83 726/22
2016/0371476 A1 * 12/2016 Turgeman ........... G06F 3/04842
2016/0373408 A1 * 12/2016 Wentworth ........... G06F 21/606
2018/0103047 A1 * 4/2018 Turgeman .......... G06Q 20/4014
2018/0270194 A1 9/2018 Beitler
2019/0377421 A1 * 12/2019 Hom ...................... G06F 3/023
2021/0133319 A1 5/2021 Rodriguez Bravo
2022/0019549 A1 1/2022 Portela
2022/0180393 A1 * 6/2022 Kudlacz ............. G06Q 30/0248
2024/0319794 A1 * 9/2024 Rosenberg .......... G06F 3/04886

OTHER PUBLICATIONS

Non-Final Office Action, U.S. Appl. No. 18/648,687 mailed Aug. 29, 2025, U.S. Patent and Trademark Office.

* cited by examiner

*Primary Examiner* — Dao Q Ho
(74) *Attorney, Agent, or Firm* — Jackson Walker L.L.P.

(57) ABSTRACT

An information handling system may include at least one processor, a memory, an external peripheral port configured to couple to external peripheral devices, and a firewall physically coupled between the at least one processor and the external peripheral port. The firewall may be configured to: receive a plurality of communications associated with the external peripheral port, wherein each communication has a time of transmission associated therewith; compare the times of transmission to a human input model to determine a likelihood that the communications were generated by a human; and in response to the likelihood being below the threshold, block the communication from proceeding.

20 Claims, 3 Drawing Sheets

PROTECTION AGAINST USB HID AUTOMATION ATTACKS

TECHNICAL FIELD

The present disclosure relates in general to information handling systems, and more particularly to improving the security of externally accessible peripheral ports such as Universal Serial Bus (USB) ports.

This application is related to U.S. patent application Ser. No. 18/648,687, filed Apr. 29, 2024 and titled "SECURE USB" (U.S. Patent Application Publication No. 2025/0335642), which is incorporated by reference herein in its entirety.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Administrators of information handling systems deployed in high-security environments sometimes have concerns about the presence of functional USB ports in such systems. Such ports can be used by threat actors for data exfiltration, installation of malware, keystroke injection, etc. Accordingly, administrators of many such systems opt to disable the USB ports altogether (e.g., via a BIOS setting or by physically removing the ports or otherwise rendering them inoperable), and instead use other keyboard and mouse interfaces such as the PS2 interface.

But PS2 I/O is quite outdated, limiting the options for what keyboards and mice can be used. Further, having to include PS2 ports in modern information handling systems for these use cases increases costs.

Accordingly, a solution that allows the use of USB ports in high-security environments while mitigating the security problems would be beneficial.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with the security of peripheral ports such as USB ports may be reduced or eliminated.

In accordance with embodiments of the present disclosure, an information handling system may include at least one processor, a memory, an external peripheral port configured to couple to external peripheral devices, and a firewall physically coupled between the at least one processor and the external peripheral port. The firewall may be configured to: receive a plurality of communications associated with the external peripheral port, wherein each communication has a time of transmission associated therewith; compare the times of transmission to a human input model to determine a likelihood that the communications were generated by a human; and in response to the likelihood being below the threshold, block the communication from proceeding.

In accordance with these and other embodiments of the present disclosure, a method may include, in an information handling system including at least one processor, an external peripheral port configured to couple to external peripheral devices, and a firewall physically coupled between the at least one processor and the external peripheral port: the firewall receiving a plurality of communications associated with the external peripheral port, wherein each communication has a time of transmission associated therewith; the firewall comparing the times of transmission to a human input model to determine a likelihood that the communications were generated by a human; and in response to the likelihood being below the threshold, the firewall blocking the communication from proceeding.

In accordance with these and other embodiments of the present disclosure, an article of manufacture may include a non-transitory, computer-readable medium having computer-executable instructions thereon that are executable by a firewall of an information handling system, wherein the information handling system includes at least one processor and an external peripheral port configured to couple to external peripheral devices, and wherein the firewall is physically coupled between the at least one processor and the external peripheral port, the instructions being executable for: receiving a plurality of communications associated with the external peripheral port, wherein each communication has a time transmission associated of therewith; comparing the times of transmission to a human input model to determine a likelihood the that communications were generated by a human; and in response to the likelihood being below the threshold, blocking the communication from proceeding.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
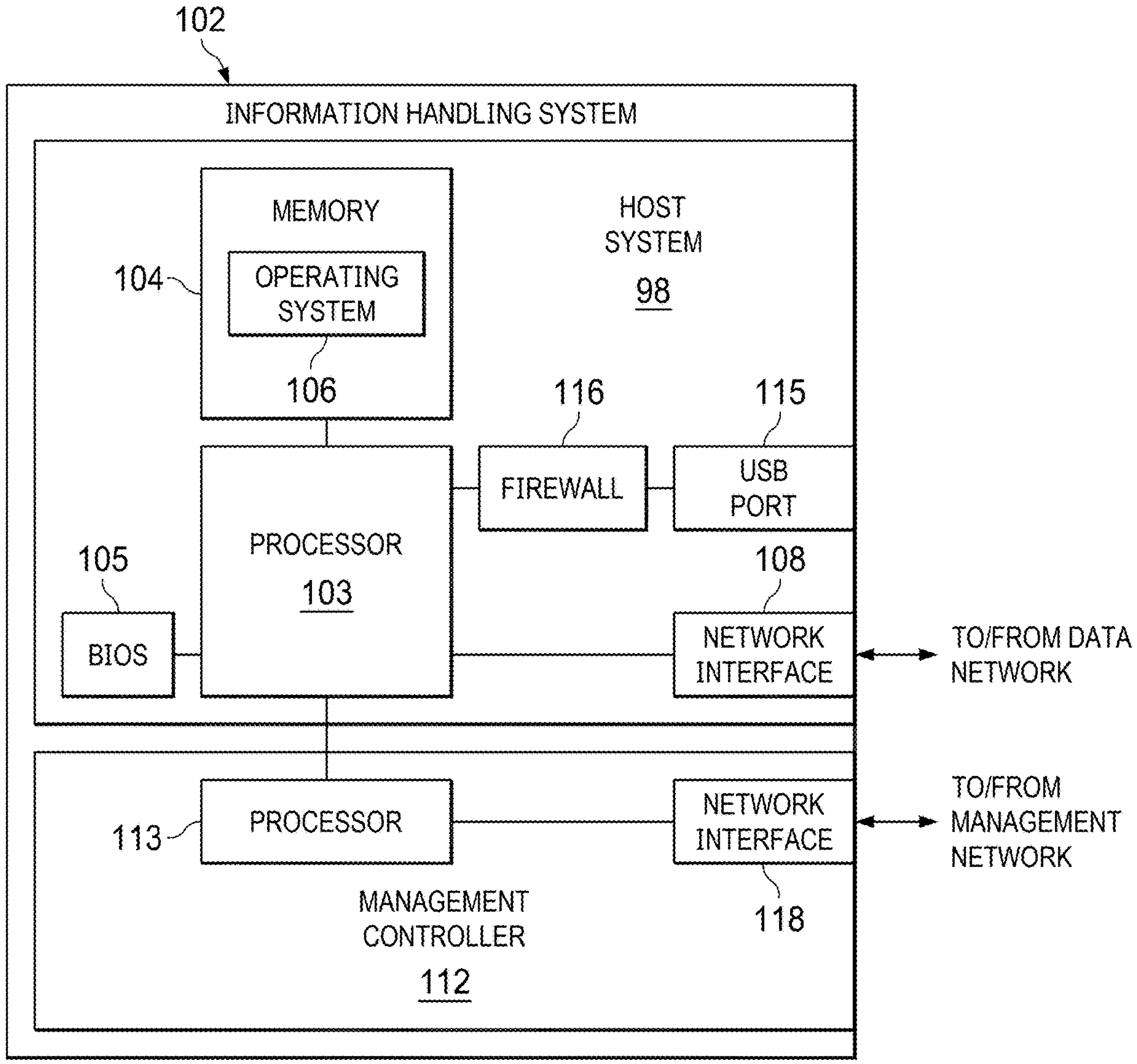
FIG. 1 illustrates a block diagram of an example information handling system, in accordance with embodiments of the present disclosure.
Figure 2:
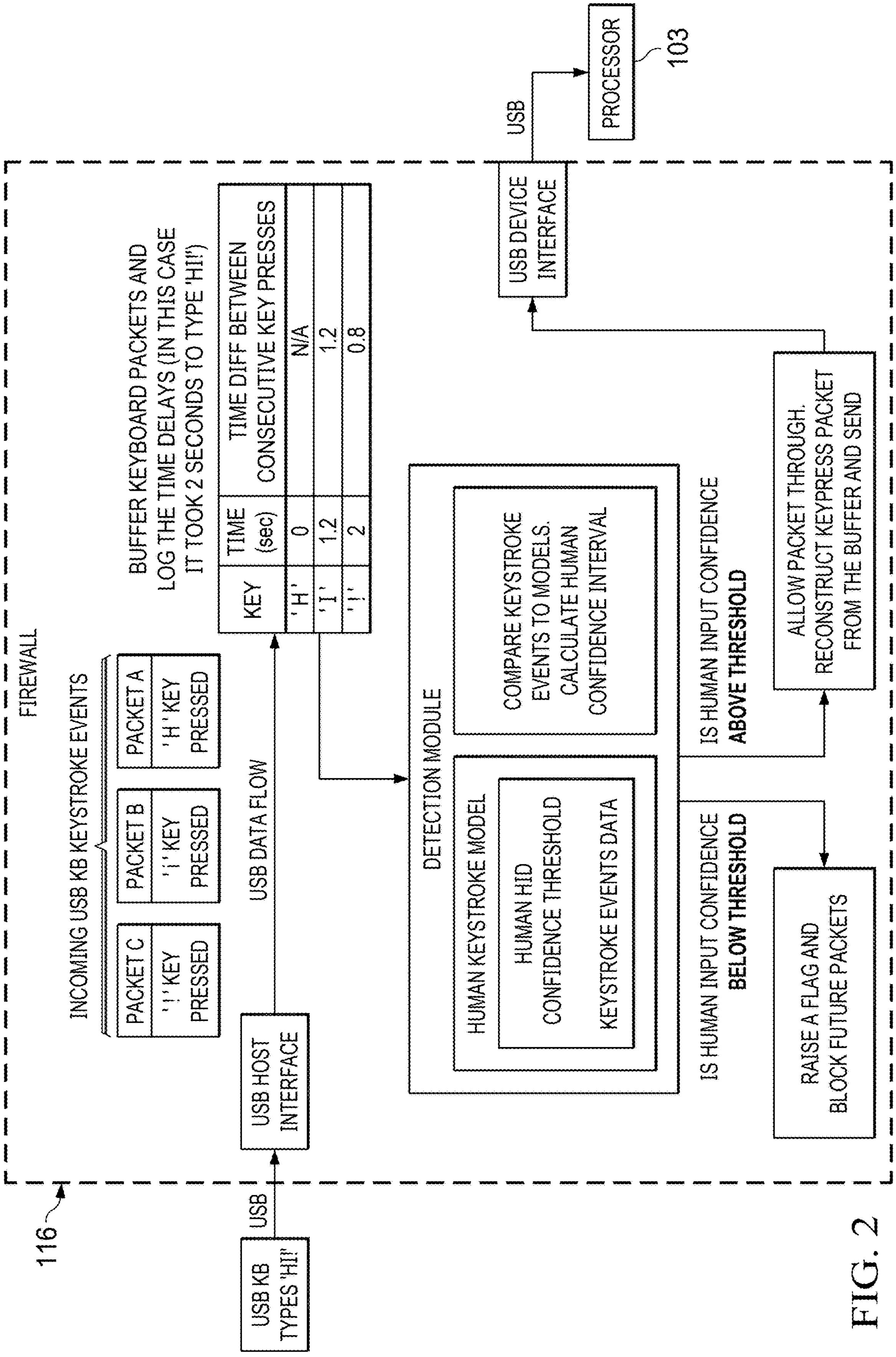
FIG. 2 illustrates an example architecture for a USB firewall operating on keyboard data, in accordance with embodiments of the present disclosure.
Figure 3:
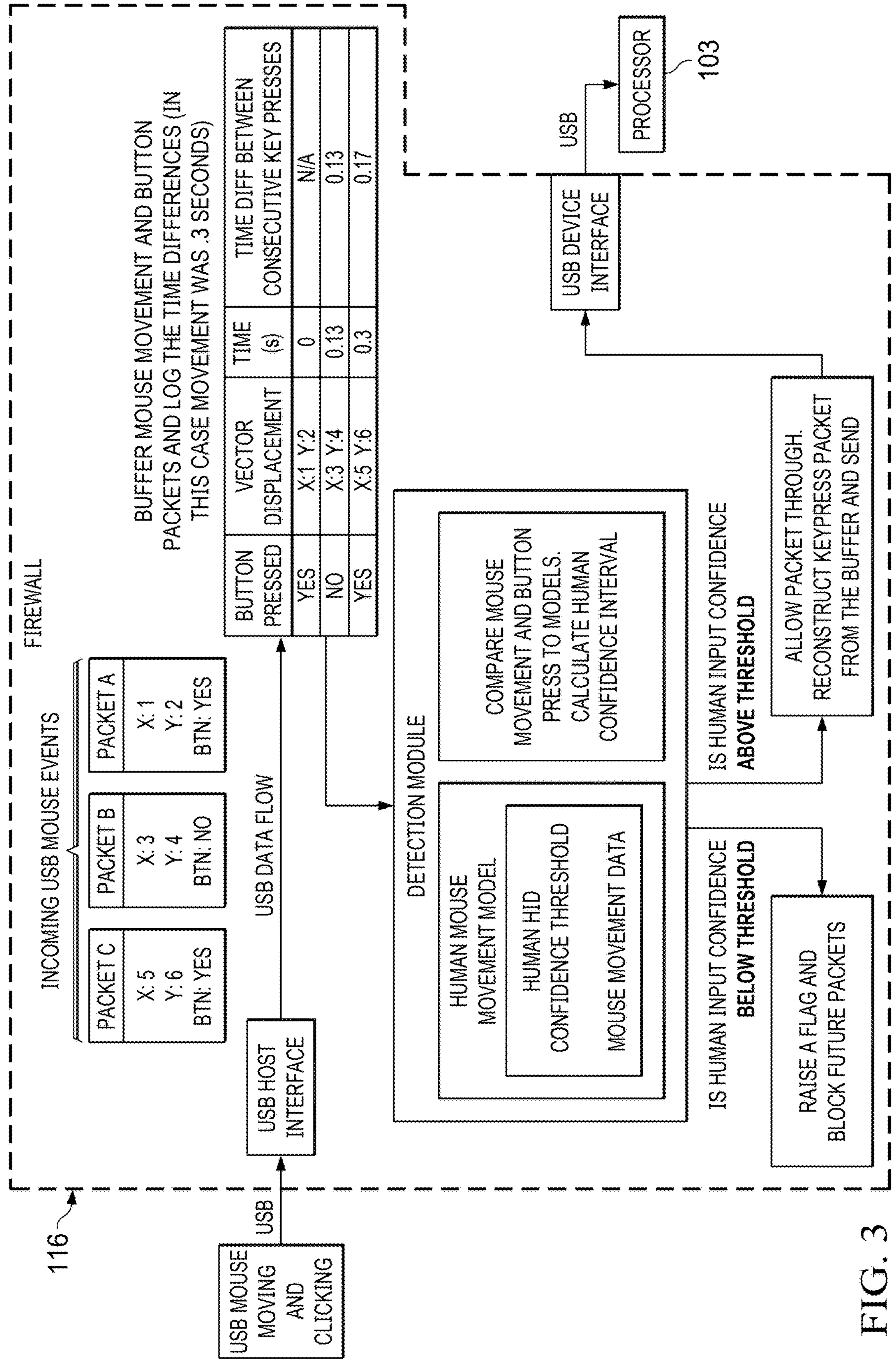
FIG. 3 illustrates an example architecture for a USB firewall operating on mouse data, in accordance with embodiments of the present disclosure.

Preferred embodiments and their advantages are best understood by reference to FIGS. 1 through 3, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

Information handling system 102 may also include one or more externally accessible peripheral ports such as USB port 115. For example, USB port 115 may be a USB 1.0 port, a USB 1.1 port, a USB 2.0 port, a USB 3.0 port, a USB 3.1 port, a USB 3.2 port, a USB4 port, a USB4 2.0 port, etc. USB port 115 may use any suitable physical connector in accordance with USB specifications.

Although the specific example of USB ports is discussed in detail herein for the sake of concreteness, one of ordinary skill in the art with the benefit of this disclosure will appreciate its applicability to other types of peripheral ports.

USB ports may generally be used to connect a keyboard, a mouse (or trackpad, trackball, etc.), a webcam, an external physical storage medium such as a flash drive, etc.

Embodiments of this disclosure improve security by preventing keystroke injection and related attacks, in which a malicious device exposes itself as a human interface device (HID) but then transmits preprogrammed or automated data to information handling system 102 instead of data generated from actual user interactions.

For example, a keystroke injection attack might be based on a USB device that appears to information handling system 102 to be keyboard (e.g., by spoofing its USB class code). When the device is inserted, it sends keystroke data configured to open a command prompt or terminal program, then transmits keystroke data configured to enter various malicious commands for execution. Keystroke injection may also be used to try to compromise passwords by making rapid automated guesses. Similar schemes may also be implemented in whole or in part via a spoofed mouse HID, where the device transmits mouse movement and click data configured to compromise information handling system 102.

In many cases, the data elements used in a keystroke or mouse injection attack are sent in quick succession (e.g., more rapidly than a human would be able to produce them using a real keyboard or mouse) in an attempt to perform the quickly and escape detection by a user. The attack suspiciously fast timing of such inputs (e.g., faster than around 300 words per minute) may be used by hardware firewall 116 to determine that the device has a likelihood of being malicious. Additional characteristics of the stream of USB packets may be used in such a determination (e.g., the regularity of the delays between keystrokes, continuous typing over a long time period without interruption, other statistical anomalies, etc.).

In one implementation, hardware firewall 116 may be used to provide improved security by being physically interposed in the USB signal lines between the USB port and the host system. Firewall 116 may be implemented as a microprocessor, microcontroller, DSP, ASIC, or any other digital or analog circuitry configured to implement the functionality discussed herein. Firewall 116 may be implemented as a separate component between USB port 115 and the USB host (the platform controller hub or PCH) that controls USB port 115, or it may be integrated into the USB host, or it may be integrated into a USB hub, etc.

Firewall 116 may perform various tasks to protect information handling system 102 from malicious peripherals inserted into USB port 115. In general, firewall 116 may analyze characteristics such as timing characteristics of packets received from peripherals connected to USB port 115 in order to determine a likelihood that they are malicious. If a device is determined to be malicious, firewall 116 may block further communication (e.g., by dropping packets, disconnecting power to USB port 115, etc.), notify a user or administrator, and/or take any other suitable remedial action. This type of functionality is typically implemented via digital means, but firewall 116 may also include analog functionality in some embodiments. For example, if firewall 116 detects malicious activity from a device, it may use a multiplexer or other analog circuitry to block that device's access to the system.

In some embodiments, firewall 116 may be implemented with two (or more) USB interfaces. For example, one such interface may be communicatively coupled to the host processor 103, and the other may be communicatively coupled as a USB host to the downstream USB device.

Firewall 116 may perform pattern recognition on the timing of inputs to distinguish between human-created input vs. automated/scripted input to prevent keyboard-based and mouse-based attacks. In the keyboard example, firewall 116 may analyze the temporal patterns and timing signatures of keystrokes by using variations in typing speed (e. g., intervals between key presses, key-down and key-up events, key-to-key variations based on keyboard layout, etc.) to distinguish between human input and automated input. In the mouse example, firewall 116 may analyze the temporal patterns and timing signatures of mouse movement events and button press events to distinguish between human input and automated input.

In one embodiment, models may be created based on datasets of natural human typing and mouse usage. Relevant markers may be extracted from the datasets to determine statistical properties such as average key press duration, time delays between presses, words per minute, etc. for keyboard analysis. For mouse analysis, the properties may include average time between button presses, time delays between subsequent mouse pointer movements, displacement vectors, etc.

In one embodiment, an artificial intelligence model may be pre-trained based on such datasets and used to analyze data captured at firewall 116. In another embodiment, a lightweight pattern matching technique may be implemented that is suitable for a low power microcontroller.

These models may be incorporated into a detection module within firewall 116, which may operate to determine a likelihood of human input vs. scripted input.

FIGS. 2 show and firewall 116 operating, 3 respectively, in a keyboard mode and a mouse mode.

In the example shown in FIG. 2, firewall 116 receives USB packets corresponding to the letters "H", "i", and "!" in sequence. Firewall 116 may buffer these packets while they are being analyzed by the detection module. The detection module compares the timing characteristics of the packets to a human keystroke model and determines a confidence level that the input is from a human. If the confidence level is above a threshold confidence (e.g., 50% or any other suitable level), then firewall 116 reconstructs the original sequence of keypresses and passes the packets along to processor 103. If not, firewall 116 may notify a user or administrator and block future packets from the device.

FIG. 3 shows a similar example, but with mouse input including mouse movements and button presses.

One of ordinary skill in the art with the benefit of this disclosure will understand that the preferred initialization point for the methods depicted in FIGS. 2 and 3 and the order of the steps comprising those methods may depend on the implementation chosen. In these and other embodiments, these methods may be implemented as hardware, firmware, software, applications, functions, libraries, or other instructions. Further, although FIGS. 2 and 3 disclose a particular number of steps to be taken with respect to the disclosed methods, the methods may be executed with greater or fewer steps than depicted. The methods may be implemented using any of the various components disclosed herein (such as the components of FIG. 1), and/or any other system operable to implement the methods.

Although FIGS. 2 and 3 illustrate an arrangement in which firewall 116 analyzes data traffic flowing from a USB keyboard or mouse inbound to processor 103, in other embodiments, firewall 116 may analyze traffic flowing in the other direction. For example, if malicious software is installed on the host system, then the USB interface could be used for data exfiltration. For example, the data could be encoded as a series of ones and zeros to be converted to light pulses. One or more LED lights on a USB device (e.g., the Caps Lock light on a keyboard) may then be used to flash in sequence to transmit the data, and a camera could read the light flashes and reconstruct the data.

The ability of firewall 116 to distinguish between automated and human-generated activity may be used to defend against this type of attack as well, mitigating the threat of data leakage. For example, rate limiting may be used to prevent large amounts of data from being sent quickly to a keyboard or mouse. Further, suspicious regularities in the timing of signals switching LEDs on and off may also be detected using techniques as discussed herein. For example, a human is unlikely to press the Caps Lock key thousands of times repeatedly, etc.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:

at least one processor;

a memory;

an external peripheral port configured to couple to external peripheral devices; and a firewall physically coupled between the at least one processor and the external peripheral port, wherein the firewall is configured to:

receive a plurality of communications associated with the external peripheral port, wherein each communication has a time of transmission associated therewith, and wherein differences between subsequent ones of the times of transmissions indicate delays between corresponding subsequent ones of the transmissions;

buffer the plurality of communications into a buffer while comparing the delays to a human input model to determine a likelihood that the communications were generated by a human;

in response to the likelihood being above a threshold, reconstruct the plurality of communications from the buffer and pass the reconstructed communications to the at least one processor; and in response to the likelihood being below the threshold, block the communications from proceeding.

2. The information handling system of claim 1, wherein the firewall comprises a microcontroller.

3. The information handling system of claim 1, wherein the external peripheral port is a Universal Serial Bus (USB) port.

4. The information handling system of claim 1, wherein the human input model is an artificial intelligence model pre-trained on a dataset of natural human input.

5. The information handling system of claim 1, wherein the communications comprise keyboard input packets.

6. The information handling system of claim 1, wherein the communications comprise mouse input packets.

7. The information handling system of claim 1, wherein the communications comprise packets sent to an external peripheral device configured to cause a light associated with the external peripheral device to turn on or off.

8. A method comprising, in an information handling system including at least one processor, an external peripheral port configured to couple to external peripheral devices, and a firewall physically coupled between the at least one processor and the external peripheral port:

the firewall receiving a plurality of communications associated with the external peripheral port, wherein each communication has a time of transmission associated therewith, and wherein differences between subsequent ones of the times of transmissions indicate delays between corresponding subsequent ones of the transmissions;

the firewall buffering the plurality of communications into a buffer while comparing the delays to a human input model to determine a likelihood that the communications were generated by a human;

in response to the likelihood being above a threshold, the firewall reconstructing the plurality of communications from the buffer and passing the reconstructed communications to the at least one processor; and in response to the likelihood being below the threshold, the firewall blocking the communications from proceeding.

9. The method of claim 8, wherein the firewall comprises a microcontroller.

10. The method of claim 8, wherein the external peripheral port is a Universal Serial Bus (USB) port.

11. The method of claim 8, wherein the human input model is an artificial intelligence model pre-trained on a dataset of natural human input.

12. The method of claim 8, wherein the communications comprise keyboard input packets.

13. The method of claim 8, wherein the communications comprise mouse input packets.

14. An article of manufacture comprising a non-transitory, computer-readable medium having computer-executable instructions thereon that are executable by a firewall of an information handling system, wherein the information handling system includes at least one processor and an external peripheral port configured to couple to external peripheral devices, and wherein the firewall is physically coupled between the at least one processor and the external peripheral port, the instructions being executable for:

receiving a plurality of communications associated with the external peripheral port, wherein each communication has a time of transmission associated therewith, and wherein differences between subsequent ones of the times of transmissions indicate delays between corresponding subsequent ones of the transmissions;

buffering the plurality of communications into a buffer while comparing the delays to a human input model to determine a likelihood that the communications were generated by a human;

in response to the likelihood being above a threshold, reconstructing the plurality of communications from the buffer and passing the reconstructed communications to the at least one processor; and in response to the likelihood being below the threshold, blocking the communications from proceeding.

15. The article of claim 14, wherein the firewall comprises a microcontroller.

16. The article of claim 14, wherein the external peripheral port is a Universal Serial Bus (USB) port.

17. The article of claim 14, wherein the human input model is an artificial intelligence model pre-trained on a dataset of natural human input.

18. The article of claim 14, wherein the communications comprise keyboard input packets.

19. The article of claim 14, wherein the communications comprise mouse input packets.

20. The article of claim 14, wherein the communications comprise packets sent to an external peripheral device configured to cause a light associated with the external peripheral device to turn on or off.

* * * * *